United States Patent [19]

Nauman

[11] Patent Number: 5,076,598
[45] Date of Patent: Dec. 31, 1991

[54] BELT SUPPORT SYSTEM FOR VEHICLE PASSENGERS

[75] Inventor: Leonard G. Nauman, Golden Valley, Minn.

[73] Assignee: Alan Design, Inc., Golden Valley, Minn.

[21] Appl. No.: 458,098

[22] Filed: Dec. 28, 1989

[51] Int. Cl.[5] .............................................. B62J 23/00
[52] U.S. Cl. .................................. 230/202; 280/273; 280/290; 224/160
[58] Field of Search ............... 297/464, 465, 466, 468; 224/158, 159, 160, 161; 280/202, 273, 290

[56] References Cited

U.S. PATENT DOCUMENTS

| 4,149,687 | 4/1979 | Nunemacher | 224/159 |
| 4,226,347 | 10/1980 | Rice | 224/35 |
| 4,226,474 | 10/1980 | Rupert | 297/465 X |
| 4,560,097 | 12/1985 | Reynolds et al. | 224/160 X |
| 4,724,988 | 2/1988 | Tucker | 224/160 |
| 4,927,211 | 5/1990 | Bolcerek | 297/465 |

FOREIGN PATENT DOCUMENTS

| 4192 | 9/1915 | United Kingdom | 224/159 |
| 969687 | 9/1964 | United Kingdom | 297/465 |

Primary Examiner—Kenneth R. Rice
Assistant Examiner—Alan M. Kagen

[57] ABSTRACT

A belt support system is provided to assist in securing and supporting a passenger on a vehicle seat, immediately in front of a rider sitting on the main vehicle seat. A first belt to be worn by the rider incorporates a pair of coupling members attached to shoulder straps at such locations as to be positioned on the front side of the rider's torso. A second belt to be worn by the passenger incorporates a second pair of coupling members located so as to be accessible on the back side of the passenger's body. With the passenger seated immediately in front of the rider, either on the same seat, or on an auxiliary seat, the two pairs of coupling members are releasably secured together. The passenger, who in most applications will be a child, is thus secured to and held by an adult rider.

For bicycle use, an auxiliary seat in the form of an elongated cushion having a slot along its length is removably placed over the horizontal bar in front of the main bicycle seat, with the slot being pushed down over the bar.

2 Claims, 1 Drawing Sheet

U.S. Patent     Dec. 31, 1991     5,076,598
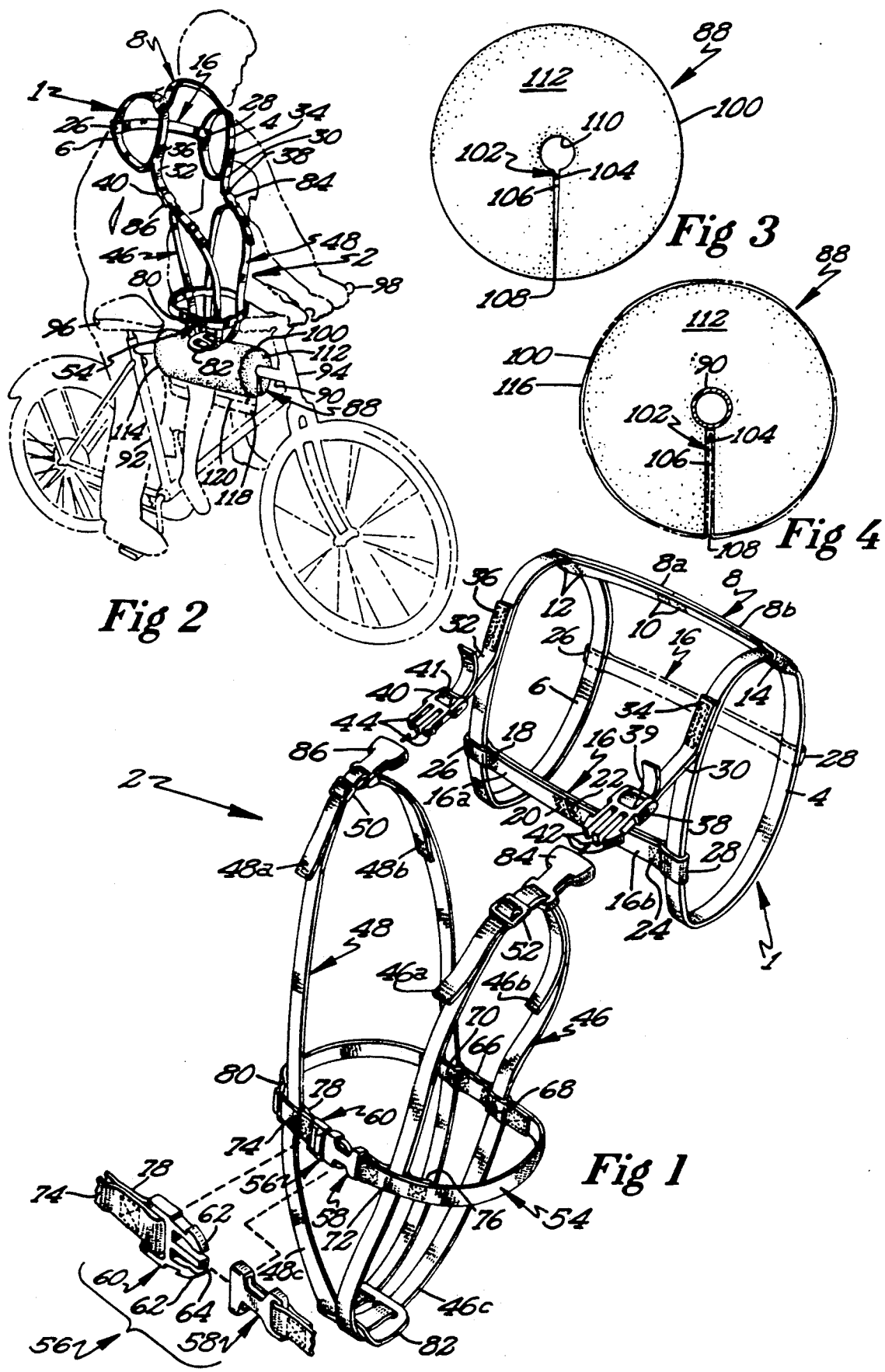

BELT SUPPORT SYSTEM FOR VEHICLE PASSENGERS

BACKGROUND OF THE INVENTION

This invention is directed to a safety belt system for securing and restraining passengers in a comfortable and effective way on various types of vehicles, including bicycles, automobiles, boats, and airplanes.

In particular, the safety belt system disclosed herein has been developed to accommodate and secure a passenger, such as a child, seated in close proximity to another passenger on a vehicle. The belt system has initially been developed for the purpose of securing a passenger, such as a child, on an auxiliary seat constructed and arranged to be supported in front of the main seat of a bicycle. Such an auxiliary seat and its mounting arrangement are disclosed in my copending application entitled "Auxiliary Seat for Bicycles".

Various safety belt systems for securing passengers in and on vehicles are known. However, there are no known safety belt systems, to my knowledge, which are particularly adapted for securing a passenger, such as a child, in front of an adult seated on a main vehicle seat. The belt system of this invention has been developed with a view towards accommodating such a dual passenger seating arrangement, with a belt provided for the adult and secured to an adult passenger serving as an attachment means for a safety belt secured around a child seated immediately in front of the adult.

BRIEF SUMMARY OF THE INVENTION

The safety belt system of this invention is particularly characterized by its ability to securely and comfortably restrain a passenger, and in particular a child, seated immediately in front of an adult on a vehicle seat.

This basic objective has been realized by providing a first belt or harness adapted to be secured around the shoulders of a rider on a vehicle seat and having coupling means positioned so as to be located on the front side of the rider's body. A second safety belt is constructed and arranged to be worn by a passenger, and most particularly by a child, seated in front of the adult rider. The second belt has complementary coupling means located thereon so as to be positioned on the back side of the passenger's body for detachable, coupling engagement with the aforesaid coupling means on the first belt worn by the rider In this way, a passenger will be secured to and supported by a rider sitting on the main seat of a vehicle The aforesaid belt system has particular application to the restraint and securing of a child passenger on a bicycle. For that purpose, an auxiliary seat is provided which is adapted to be secured to the horizontal bar extending between the main seat post and the horizontal post of a bicycle, at a location forwardly of the main seat The auxiliary seat is slotted along its length, on the bottom side thereof, for quick and easy, slidable fitting over the aforesaid bicycle horizontal bar. When sitting on such an auxiliary bicycle seat, immediately in front of an adult riding on the main seat, the aforesaid complementary coupling means on the child's safety belt may be quickly, detachably engaged with the coupling means on the adult's belt.

Advantageously, the first or adult belt is comprised of a pair of opposed, looped shoulder straps through which the adult rider's arms extend and which are adapted to fit around the rider's shoulders. A neck strap extends between the two looped shoulder straps and is adapted to lie across the top of the rider's shoulders. In this way, any load imposed by the transmission of forces from the second belt secured to the child passenger will be comfortably and effectively borne by the shoulders of the adult rider.

As a further beneficial feature, effective and convenient detachable engagement of the coupling members on the two belts is provided by utilizing a pair of coupling members on a pair of shoulder straps of the second passenger belt so that they can be slidably positioned for engagement with a pair of coupling members secured to shoulder straps on the first rider's belt on the front side of the torso of the rider.

These and other objects and advantages of the invention will become readily apparent as the following description is read in conjunction with the accompanying drawings wherein like reference numerals have been used to designate like elements throughout the several views.

BRIEF DESCRIPTION OF THE DRAWINGS

FIG. 1 is a perspective, exploded view of the safety belts of this invention;

FIG. 2 is a perspective view showing a bicycle with an auxiliary seat for a passenger, with which the safety belt system shown in FIG. 1 is intended to be used;

FIG. 3 is an end view of the auxiliary seat in its condition of nonuse; and

FIG. 4 is an end view similar to FIG. 3, but showing the auxiliary seat in the condition it assumes when mounted on the horizontal bar of a bicycle, with the bar being shown in section.

DESCRIPTION OF THE PREFERRED EMBODIMENT

With reference to the drawings, FIG. 1 illustrates in exploded, perspective view the seat belt apparatus of this invention comprising a first belt 1 adapted to be worn by a rider on a vehicle, and a second belt 2 particularly constructed for a passenger seated directly in front of a rider wearing belt 1. Although not limited to such applications, the seat belt apparatus has been particularly designed and developed for supporting a child passenger riding on a vehicle, such as a bicycle, boat seat, automobile seat, or airplane seat, directly in front of an adult.

Belt 1 preferably is in the form of a shoulder harness and is comprised of a pair of opposed, looped shoulder straps 4 and 6 through which the rider's arms extend and which are adapted to fit around the rider's shoulders. A neck strap 8 is secured between shoulder straps 4 and 6, and is wrapped around top portions of those straps as shown in FIG. 1. Opposed end segments 8a and 8b of neck strap 8 overlap the main strap, and are secured thereto adjacent to shoulder straps 4 and 6, as by stitching indicated by reference numerals 12 and 14. Strap or harness 1 further includes a strap 16 secured between the rear sides of shoulder straps 4 and 6, and preferably is looped therearound as shown so as to be slidably adjustable thereon. End segments 16a and 16b of strap 16 are stitched to the rear side thereof in overlapping relation to the main strap 16 at spaced-apart locations indicated by reference numerals 18, 20, 22, and 24. Stitches 18 and 24 form loops 26 and 28 by means of which strap 16 may be slidably adjusted upwardly and downwardly on shoulder straps 4 and 6 so as to best conform to the back of the wearer in the area of the shoulder blades The preferred location of strap 16 is indicated in phantom lines in FIG. 1 and in solid lines in FIG. 2.

Attached to the front or chest side of shoulder straps 4 and 6 are a pair of coupling straps 30 and 32, stitching 34 and 36 being preferably utilized to secure coupling straps 30 and 32 at the desired locations on shoulder straps 4 and 6. The free ends of coupling straps 30 and 32 are attached to a pair of coupling members 38 and 40, preferably by simply looping those free ends through buckles 39 and 41 thereon. Coupling members 38 and 40 are commercially available buckle-type couplings, and include forwardly projecting male coupling elements in the form of spaced-apart prongs 42 and 44. Prongs 42 and 44 are adapted to be releasably and detachably received in complementary coupling members 84 and 86 on the second belt 2, as hereinafter set forth.

The second belt 2 has been particularly constructed and designed for use with its primary application to child passengers. Thus, belt 2 takes the form of a harness comprised of a pair of shoulder straps 46 and 48 having opposed end segments 46a, 46b and 48a, 48b, which overlap each other adjacent to slide buckles 50 and 52, through which they are connected as shown in FIG. 1. Straps 46 and 48 may thus be adjusted by means of slide buckles 50 and 52 so as to securely fit around the shoulders of a passenger.

Belt or harness 2 is further comprised of a waist belt 54 adapted to be secured around the waist of a passenger by means of a main belt buckle 56. Buckle 56 is of the same construction as couplings 38, 84 and 40, 86. Thus, belt buckle 56 is comprised of a buckle sleeve 58, which is adapted to receive a buckle insert tongue 60 in releasable, buckling engagement therewith. Buckle tongue 60 is comprised of a plurality of prongs including a pair of outer prongs 62 and an inner latch, guide prong 64. Outer prongs 62 are spring members which may be squeezed inwardly towards each other for insertion within buckle sleeve 58. When thus inserted, prongs 62 spring outwardly to maintain a secure, friction engagement of insert tongue 60 within buckle sleeve 58.

A pair of rear belt loops 68 and 70 are provided on the rear side of waist belt 54 by stitching a belt loop segment 66 thereto. A second pair of belt loops 72 and 74 are provided on the front side of waist belt 54. Belt loop 72 is formed by stitching a loop strap 76 to the inside of waist belt 54 at the location shown in FIG. 1. The second front belt loop 74 is formed by passing one end 78 of belt 54 through the apertured end of buckle insert or tongue 60 and looping it back on itself through belt adjustment buckle 80. Adjustment buckle 80 is of the same conventional type as those shown at 50 and 52 on shoulder straps 46 and 48, and belt end 78 may be pulled therethrough to adjust belt 54 around the waist of the wearer.

Shoulder straps 46 and 48 preferably include lower, looped segments 46c and 48c which extend under the wearer's crotch and slip through slots in a crotch pad 82 as shown. With such a belt arrangement, the belt 2 takes the form of a body harness which is particularly well suited for securely engaging and supporting a child passenger.

Slidably supported and adjustably secured to the rear side of shoulder straps 46 and 48 are a pair of coupling members 84 and 86 having rearwardly projecting, slotted or sleeve type of buckle elements as shown. The coupling members 84 and 86 are sleeve type of buckle members identical to buckle 58 utilized on waist belt 54. Thus, the outer prongs 42 and 44 on coupling members 38 and 40 of the first belt 1 may be slidably received within coupling members 84 and 86 by squeezing them together. When so connected, complementary coupling members 38, 84 and 40, 86 are releasably coupled together in secure engagement.

FIG. 2 illustrates the use of cooperating belts 1 and 2 on an adult rider and a child passenger on a bicycle. With such an arrangement, a special, auxiliary seat 88 is provided for mounting on the horizontal bar 90 of the bicycle. Such a bicycle, as illustrated in FIG. 2, is either a man's bicycle, or a woman's bicycle which has a horizontal bar 90 provided as an attachment. Horizontal bar 90 extends between an upright seat post 92 and a handlebar support post 94. A main rider's seat 96 is mounted on top of post 92, and a handlebar assembly 98 is supported on post 94.

Auxiliary seat 88 is preferably in the form of an elongated, cylindrical body 100 made of material having sufficient density to support the weight of a person. Although various materials may be utilized for forming such a seat, polyurethane foam of at least medium density has been found to be particularly suitable The cylindrical seat body 100 has opposed end walls 112 and 114.

Extending lengthwise over the entire length of the seat body 100 is an elongated slot 102 defined by opposed side walls 104 and 106. Slot 102 terminates at its lower end in a continuous opening 108 extending through the outer surface of cylindrical body 100. At its upper end, slot 102 is closed, and preferably terminates in a tubular passage 110 as shown most clearly in FIG. 3.

As may be noted by reference to FIGS. 2-4 of the drawings, slot 102 extends substantially vertically when the seat cushion is oriented horizontally for mounting on the horizontal bar of a bicycle, with tubular passage 110 being located substantially along the longitudinal central axis of the seat cushion body 100. Thus, slot 102 extends vertically between continuous opening 108 at the bottom thereof and tubular passage 110 at its upper end. Elongated passage 110 is advantageously sized so that it will be of a lesser diameter than the horizontal bar to be found on most men's bicycles. As a result, tubular passage 110 will be stretched radially so as to compress the material of seat body 100 surrounding it, when slot 102 is forced downwardly over the bicycle horizontal bar 90. Thus, after installation on the horizontal bar 90 of the bicycle to the position shown in FIGS. 2 and 4, the resilient material of seat body 100 will spring back inwardly around horizontal bar 90 in secure, embracing engagement therewith. In this way, the auxiliary seat 88 is firmly held in place on the horizontal bar of the bicycle without the need of any special mounting hardware or brackets or special fasteners It will thus be seen that auxiliary seat 88 can be quickly and easily mounted on the horizontal bar of a bicycle, forwardly of the main seat by simply positioning seat body 100 on top of the bar with continuous opening 108 of slot 102 aligned longitudinally with the bar. Downward force applied to the seat body 100 will force slot 102 downwardly over the bar 90. As this happens, the side walls 104 and 106 of slot 102 will be spread apart to the position shown in FIG. 4. Side walls 104 and 106 are normally positioned closely adjacent to each other, and preferably slightly tapered upwardly and outwardly as shown in FIG. 3. After slot 102 is pushed downwardly over its full extent so as to bring elongated passage 110 against and around the horizontal bicycle bar 90, side walls 104 and 106 of slot 102 will remain in an outwardly spread condition as shown in FIG. 4. However, the gap between side walls 104 and 106 as shown in FIG. 4 will be less than the width or diameter of the bicycle bar 90. As a result, side walls 104 and 106 will be urged inwardly towards each other, as will the material of cushion body 100 defining tubular passage 110. This provides a tight fit of tubular passage 110 around bar 90, which serves to securely hold the auxiliary seat 88 in place.

After removable mounting on the horizontal bar 90 of a bicycle as shown in FIGS. 2 and 4, the auxiliary seat 88 may be readily adjusted along the length of bar 90 by simply sliding it back and forth. Tubular passage 110 facilitates such slidable adjustment. The location of seat 88 on bar 90 may be longitudinally adjusted in such a manner so that the person seated thereon may comfortably grasp the handlebars 98 to hold himself on the bicycle Also, the uniform, cylindrical shape of seat body 100 permits the passenger to rest comfortably on the auxiliary seat at any location along its length; and even if the seat body 100 should rotate slightly around bicycle bar 90, the uniform geometry of seat body 100 will present a comfortable surface to the passenger.

Although not essential, a cover generally indicated by reference numeral 116 may be provided around seat body 100. Cover 116 may be made of nylon, or of any other suitable, durable material. Cover 116 is preferably made so that it totally covers all of the outer surface of seat body 100, including end walls 112 and 114. FIG. 4 shows cover 116 in phantom as it would be positioned in embracing relation to seat body 100, and extending within slot 102.

Cover 116 may also be formed to include a downwardly depending pocket 118 having a closure flap 120 snapped in place thereon This permits the carrying of articles on seat cover 116. Although shown depending downwardly directly under slot opening 108, pocket 118 could be formed integrally with cover 116 at any point along the length thereof, around its periphery.

Seat belt or harness 1 is worn by a bicycle rider, such as the adult shown in phantom lines in FIG. 2. The rider will be seated on the main bicycle seat 96. Belt 1 will be worn by him in the manner shown, with the rider's arms extending through looped shoulder straps 4 and 6. With belt 1 worn by the rider in such a manner, coupling members 38 and 40 will be disposed on the front side of the rider's torso. The second belt or harness 2 is worn by a passenger, such as the child shown in phantom lines in FIG. 2, sitting on the auxiliary seat 88. The passenger will be seated directly in front of the adult rider, as shown, in position for the passenger to grasp the handlebars 98 of the bicycle With the child wearing harness 2 in the manner shown in FIG. 2, complementary coupling members 84 and 86 will be positioned on the rear side of the passenger, near the top of his shoulders. This construction and arrangement of the two pairs of coupling members on the belts 1 and 2 permits the convenient coupling of members 38, 84 and 40, 86 together at the location shown in FIG. 2. It will thus be seen that the passenger, such as a child, will be supported and held by the adult rider, by way of the detachable, coupling engagement of the harnesses 1 and 2 together. The coupling members may readily be released or unbuckled simply by squeezing inwardly on prongs 42, 44 of coupling members 38 and 40 so as to pull those members out of the complementary coupling sleeves 84 and 86. The provision of neck strap 8 constructed and located so as to extend across the top of the shoulders of the rider, behind his neck, permits any weight load of the child through forces generated in riding a vehicle, to be comfortably borne by the rider wearing belt 1. Lower, looped segments 46c and 48c, shoulder straps 46 and 48 on the passenger, will extend under the torso and through the crotch of the passenger as illustrated in FIG. 2. Thus, belt 2 securely engages the body of the child passenger in a harness-like fashion.

The application of the seat and belt system to a child passenger on a bicycle, as illustrated and described with respect to FIG. 2, is by way of example only. The belt system may be utilized to assist in holding and securing a passenger on any type of vehicle. Anticipated applications include those of a child sitting on a seat in front of an adult in a boat, automobile, or airplane. The belt system would also be particularly useful in holding a child on a seat in front of an adult on a snowmobile. If the adult is thrown off of any such vehicle due to a sudden swerve or accident, he will take the child passenger with him, since the belts 1 and 2 are coupled together It is anticipated that various changes may be made in the size, shape, and construction of the belt and seat system disclosed herein without departing from the spirit and scope of the invention as defined by the following claims.

What is claimed is:

1. A seating and belt system for supporting a passenger on a bicycle having a horizontal bar extending between a seat post supporting a rider seat thereon and a handlebar post positioned forwardly thereof, comprising:

an auxiliary seat removably mounted on the aforesaid horizontal bar forwardly of said main rider seat;

a first belt adapted to be worn by a rider on said main seat, said first belt including a pair of opposed, looped shoulder straps through which the rider's arms extend and that are adapted to fit around the rider's shoulders and further including a neck strap connected between the top of said looped shoulder straps and adjusted to lie across and bear against the top of the shoulders of the rider, said first belt having coupling means located thereon so as to project forwardly from the front of the rider's body, said coupling means comprising a pair of coupling members secured to said shoulder straps and extending forwardly therefrom; and a second belt adapted to be worn by a passenger sitting on said auxiliary seat in front of the main seat, said second belt having first and second looped shoulder straps adapted to be secured over the tops of the shoulders of the passenger and extending downwardly between the legs of the passenger, said second belt further including a waist belt for encircling the passenger's waist, said waist belt including a pair of free ends secured to each other by a coupling means with one of said free ends being looped back on itself through an adjustment means, and further, front and rear pairs of belt loops, said pairs of belt loops being provided for adjusting the position of said waist belt vertically relative to said second belt shoulder straps, said rear pair of belt loops slidably receiving said first and second shoulder straps of said second belt on the back side of the passenger and said front pair of belt loops slidably receiving said first and second shoulder straps of said second belt on the front side of the passenger, said rear belt loops being constructed by stitching a belt loop segment to said waist belt and one of said front belt loops being constructed by stitching a loop strap to said waist belt and wherein said other one of said front belt loops is formed by said looped back free end of said waist belt, said second belt further having complementary coupling means located thereon so as to project rearwardly from the back side of the passenger's body for detachable, coupling engagement with said coupling means on said first belt, said complementary coupling means comprising first and second complementary coupling members attached to said shoulder straps and constructed to releasably couple to said pair of coupling members on said first belt, whereby a passenger sitting on said auxiliary seat will be secured to and supported by a rider sitting on the main seat.

2. A seating and safety belt system as defined in claim 1 wherein:

said auxiliary seat is an elongated cushion having a slot extending over the entire length thereof, said slot being defined in part by a pair of opposed side walls and terminating at its lower end in a continuous opening in the bottom of said seat cushion extending through the outer surface thereof and the upper end of said slot being closed and terminating within the body of said seat cushion, said slot straddling said horizontal bar with said upper, closed end of said slot embracing the horizontal bar in secure, restraining engagement therewith, said auxiliary seat further including a cover disposed around said cushion and extending within said slot to engage said opposed side walls.

* * * * *